US012102582B2

(12) United States Patent
Asefvaziri

(10) Patent No.: US 12,102,582 B2
(45) Date of Patent: Oct. 1, 2024

(54) HANDS-FREE ELECTROMECHANICAL VIBRATING FEMALE STIMULATION DEVICE

(71) Applicant: My Gem Products, LLC., Toluca Lake, CA (US)

(72) Inventor: Hedyeh Asefvaziri, Toluca Lake, CA (US)

(73) Assignee: My Gem Products, LLC., Toluca Lake, CA (US)

(*) Notice: Subject to any disclaimer, the term of this patent is extended or adjusted under 35 U.S.C. 154(b) by 1031 days.

(21) Appl. No.: 16/786,940

(22) Filed: Feb. 10, 2020

(65) Prior Publication Data

US 2021/0244607 A1 Aug. 12, 2021

(51) Int. Cl.

*A61H 19/00* (2006.01)
*A61H 15/00* (2006.01)
*A61H 23/00* (2006.01)
*A61H 23/02* (2006.01)

(52) U.S. Cl.

CPC ......... *A61H 19/34* (2013.01); *A61H 15/0078* (2013.01); *A61H 19/40* (2013.01); *A61H 23/006* (2013.01); *A61H 23/02* (2013.01); *A61H 2201/0119* (2013.01); *A61H 2201/0165* (2013.01); *A61H 2201/5097* (2013.01)

(58) Field of Classification Search

CPC ........ A61H 19/30; A61H 19/34; A61H 19/40; A61H 19/50; A61H 15/0078; A61H 15/0085; A61H 23/006; A61H 23/02; A61H 2201/0119; A61H 2201/0165; A61H 2201/5097

See application file for complete search history.

(56) References Cited

U.S. PATENT DOCUMENTS 8,579,837 B1 * 11/2013 Makower ........... A61H 23/0263 601/6
10,076,463 B2 * 9/2018 Fine ........................ A61H 19/50
2005/0124853 A1 * 6/2005 Norma ................... A61H 19/50 600/38

FOREIGN PATENT DOCUMENTS

WO WO 2020/056220 * 3/2020 ............. A61H 19/34
WO WO-2020056220 A1 * 3/2020 ............... A61F 5/41

* cited by examiner

*Primary Examiner* — Carrie R Dorna
(74) *Attorney, Agent, or Firm* — Elizabeth Yang

(57) ABSTRACT

A hands-free female sexual organ stimulation apparatus stimulates the vulva region by detachably clipping to the labia majora while generating multiple speeds of vibrations to produce stimulation at the female sexual organ. The apparatus comprises an elongated disc sized to mate with the vulva. The disc has a mount face, an opposing stimulation face, and an outer wall extending therebetween. The stimulation face forms a flush, mating relationship with the vulva. A vibration portion rests concentrically on the stimulation face. The vibration portion engages the clitoris and the urethra while being partially fitted into the vagina. A vibratory motor with multiple speeds is embedded into the vibration portion. A receiver and a remote transmitter remotely control the vibratory motor. A tension clip detachably clips the disc to the labia majora. The clip has a curved shape that reduces pressure for enhanced comfort to the labia majora.

18 Claims, 6 Drawing Sheets

HANDS-FREE ELECTROMECHANICAL VIBRATING FEMALE STIMULATION DEVICE

CROSS REFERENCE OF RELATED APPLICATIONS

This application claims the benefits of U.S. provisional application No. 62/803,298, filed Feb. 8, 2019 and entitled HANDS-FREE ELECTROMECHANICAL VIBRATING FEMALE STIMULATION DEVICE, which provisional application is incorporated by reference herein in its entirety.

FIELD OF THE INVENTION

The present invention relates generally to a hands-free female sexual organ stimulation apparatus. More so, the present invention relates to a stimulation apparatus that stimulates the vulva region of the female by detachably clipping to the labia majora, or outer folds of the vulva, to form a snug, mating relationship with the vulva while generating multiple speeds of vibrations that create a stimulating massage in the area of the clitoris, urethra, and labia minora; whereby the stimulation apparatus comprises an elongated disc having a mount face and an opposing stimulation face adapted to form a flush, mating relationship with the vulva; and also having a vibration portion resting concentrically on the stimulation face and adapted to engage the urethra while fitted into the vagina; and also having a vibratory motor with multiple speeds embedded into the vibration portion; and also having a receiver and a remote transmitter that remotely control the vibratory motor; and further having an opposing tension clip attached to the mount face that are biased to detachably clamp to the labia majora, so as to align the vibration portion concentrically with the urethra while fitted into the vagina.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, sexual stimulation in the female sexual organ results in smooth muscle relaxation and arterial vasodilation within the clitoris. The resultant increase in blood flow leads to tumescence of the glans clitoris and increased sexual arousal. Generally, a female stimulation device is a device for stimulating female sexual response and then stimulating the clitoral area to achieve female orgasm. Many devices including vibrating effect to enticing the clitoris has been provided in the current market. The most common device are vibrators and other mechanical devices which create friction against clitoris.

Such vibrators and mechanical devices usually comprise an electrically driven vibrating means and a handle bar by which the vibrators and the mechanical devices can be grasped, so in this manner, the user need to hold the vibratos or mechanical by hands. Therefore, these kinds of vibrators or mechanical devices may lead to difficulty or inability to clitoral tumescence, especially in women who suffer from female sexual disorder.

Another very effective way of stimulating the clitoris and region is the use pulsating positive air pressure to peen or to pulsate the clitoris by varying frequency to create stimulation. The above-mentioned device usually comprises a tissue-contacting chamber and the motor type stimulators to encourage clitoral engorgement. However, the above-mentioned device always need the users to grasp on the tissue-contacting chamber.

Other proposals have involved devices for stimulating the device. The problem with these hands-free female sexual organ stimulation apparatuses is that they are not adapted for the needs of a male and female separately. Even though the above cited female stimulation devices meet some of the needs of the market, a hands-free female sexual organ stimulation apparatus. More so, the present invention relates to a stimulation apparatus that stimulates the vulva region of the female by detachably clipping to the labia majora, or outer folds of the vulva, to form a snug, mating relationship with the vulva while generating multiple speeds of vibrations that create a stimulating massage in the area of the clitoris, urethra, and labia minor, is still desired.

SUMMARY

Illustrative embodiments of the disclosure are generally directed to a hands-free female sexual organ stimulation apparatus. The female sexual organ stimulation apparatus serves to stimulate the vulva region of the female by detachably clipping to the labia majora, or outer folds of the vulva, to form a snug, mating relationship with the vulva while generating multiple speeds of vibrations that create a stimulating massage in the area of the clitoris, urethra, and labia minora. By clipping the apparatus to the labia majora, the hands of the female user are not required for operation.

In one embodiment, the female sexual organ stimulation apparatus comprises an elongated disc that is sized to mate with the vulva of the female in a snug relationship. The disc is defined by a mount face, an opposing stimulation face, and an outer wall extending between the faces. The stimulation face is adapted to form a flush, mating relationship with the vulva. In addition, a vibration portion rests concentrically on the stimulation face. The vibration portion is adapted to engage the urethra while being at least partially fitted into the vagina. The vibration portion has a central section and an inner wall protrudes around the perimeter of the vibration portion, so as to create space, and thereby ventilation, between the stimulation face and the vulva.

The stimulation apparatus also includes a vibratory motor with multiple speeds embedded into the vibration portion. A receiver and a remote transmitter remotely control the vibratory motor. The stimulation apparatus also includes a tension clip that attach to the mount face. The tension clip is biased to detachably clamp to the labia majora. The tension clip is defined by a curved shape that forms a comfortable, snug relationship with the labia majora. The diametric arrangement of the tension clip helps align the vibration portion concentrically with the urethra while fitted into the vagina.

In one aspect, the hands-free female sexual organ stimulation apparatus, comprises:

an elongated disc defined by a mount face, a stimulation face opposing the mount face, and an outer wall extending between the faces;

a vibration portion disposed concentrically on the stimulation face of the disc, the vibration portion comprising a central section and an inner wall, the inner wall disposed around the perimeter of the central section, the inner wall protruding above the central section;

a vibratory motor disposed in the cavity of the vibration portion, the vibratory motor being operatively connected to the vibration portion, the vibratory motor being operable to vibrate the vibration portion at multiple speeds and intensities; and a tension clip extending beyond the perimeter of the outer wall of the disc, the tension clip defined by a curved shape, the tension clip being biased towards a clamped position.

In another aspect, the disc has a rectangular shape.

In another aspect, the stimulation face is adapted to form a flush, mating relationship with the vulva.

In another aspect, the vibration portion is adapted to engage the urethra while at least partially fitted on top of the clitoris.

In another aspect, the tension clip is arranged to clip to the labia majora.

In another aspect, the tension clip is defined by a curved shape adapted to snugly engage the labia majora.

In another aspect, the tension clip comprises a pair of curved arms.

In another aspect, the vibratory motor is operable to vibrate the vibration portion.

In another aspect, the apparatus further comprises a roller, the roller being operable to roll around the central section of the vibration portion.

In another aspect, the vibratory motor is operable to actuate the roller to roll across the central section of the vibration portion at multiple speeds.

In another aspect, the vibratory motor is operable to actuate the central section of the vibration portion to oscillate at multiple speeds and intensities at multiple speeds.

In another aspect, the apparatus further comprises a receiver operatively connected to the vibratory motor.

In another aspect, the apparatus further comprises a transmitter.

In another aspect, the transmitter emits a signal to the receiver to actuate the vibratory motor.

In another aspect, the signal comprises a radio frequency signal.

One objective of the present invention is to sexually stimulates a female sexual organ while eliminating use of the hand.

Another objective is to minimize pain when attaching the assembly to the vulva.

Yet another objective is to provide multiple speeds and intensities for the vibrations.

Yet another objective is to create a curved shape clip that fits comfortably on the labia majora.

Yet another objective is to create a rectangular-shaped stimulation face for the disc that is adapted to form a flush, mating relationship with the vulva Yet another objective is to provide an inexpensive to manufacture the hands-free female sexual organ stimulation apparatus.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
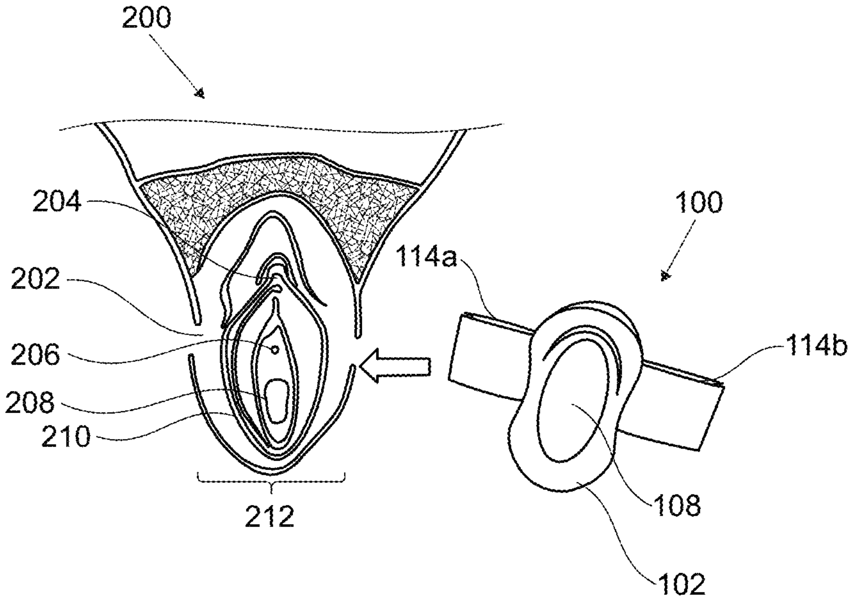
FIG. 1 illustrates a perspective view of a female sexual organ, and an exemplary hands-free female sexual organ stimulation apparatus, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A hands-free female sexual organ stimulation apparatus 100 and method 700 for attaching to the female sexual organ 200 are referenced in FIGS. 1-8B. The hands-free female sexual organ stimulation apparatus 100, hereafter "apparatus 100" is a unique female sexual stimulation tool that requires no hands to apply to the area of the vulva 212, so as to stimulate the specific sections of the female sexual organ 200, like: the clitoris 204, the urethra 206, the vagina 208, the labia majora 202, and the labia minora 210 (Shown in FIG. 1). A vibration portion 108 engages the urethra 206 and vagina 208. Further, a unique tension clip 114*a*, 114*b* easily clip to the labia majora 202. The tension clip 114*a*, 114*b* have curved arms 116*a*, 116*b* that mitigate pressure on the labia majora 202 so as to provide optimal comfort during sexual stimulation.

Figure 2:
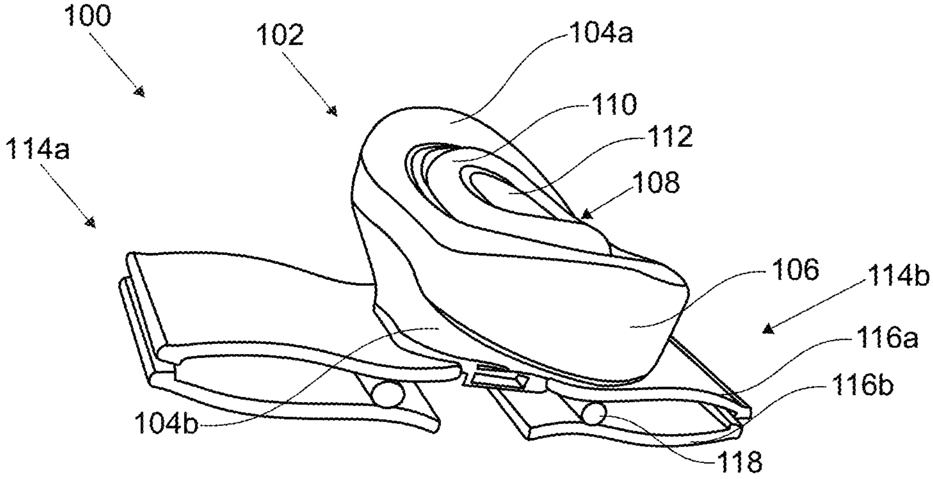
FIG. 2 illustrates a top perspective view of the hands-free female sexual organ stimulation apparatus shown in FIG. 1, showing the tensioned clip above the body of the disc, in accordance with an embodiment of the present invention.

As referenced in FIG. 2, apparatus 100 comprises an elongated disc 102 that forms the foundation of the apparatus 100. The elongated disc 102 is sized and dimensioned to mate with the vulva 212 of the female in a snug relationship. In some embodiments, the disc 102 may have a mount face 104*b*, and an opposing stimulation face 104*a*. The configuration of the stimulation face 104*a* is shaped and dimensioned to form a flush, mating relationship with the vulva 212. This may even create a tight seal therebetween. Further, the disc 102 comprises an outer wall 106 that extends between the faces. In one non-limiting embodiment, the disc 102 has an oval shape, which can be small, medium, or large sizes to accommodate variously sized female sexual organs 200.

Looking again at FIG. 1, the apparatus 100 also includes a vibration portion 108 that is disposed concentrically on the stimulation face 104*a* of the disc 102. The vibration portion 108 has a central section 112, which may be curvy and smooth. An inner wall 110 protrudes around the perimeter of the vibration portion 108, so as to create space, and thereby ventilation, between the stimulation face 104*a* and the vulva 212. The inner wall 110 is disposed approximately at the perimeter of the central section 112.

Figure 8A:
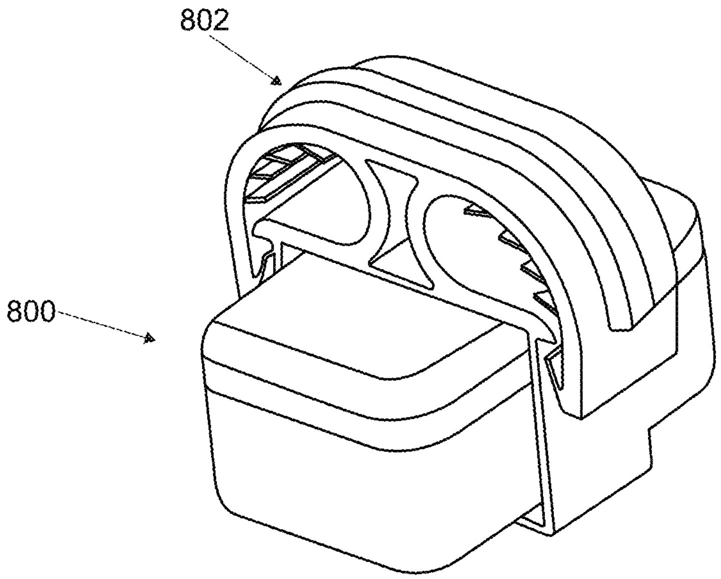
FIGS. 8A and 8B illustrate perspective view of the vibration portion with detachable grips, in accordance with an embodiment of the present invention.
Figure 8B:
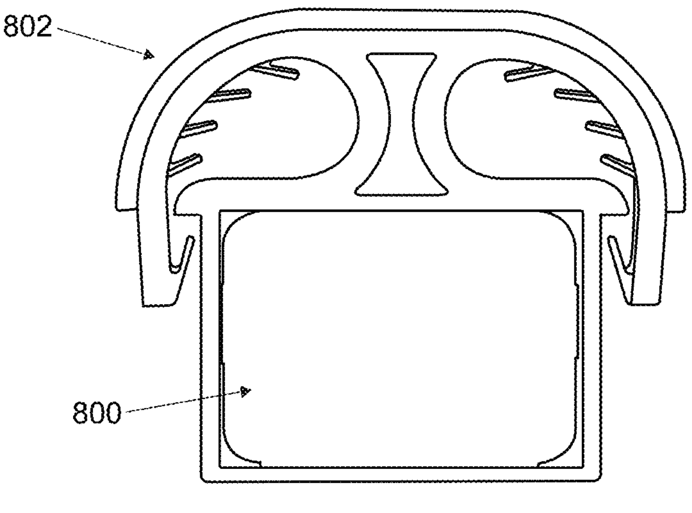

The inner wall 110 is curved and smooth, protruding above the central section 112 to help spread the vagina 208, and also to create ventilation between the vibration portion 108 and the vulva 212. The vibration portion 108 is sized and dimensioned to engage the urethra 206 while at least partially fitted into the vagina 208. Both the urethra 206 and the vagina 208 are shown in relation to the position of the apparatus in FIG. 1. The inner wall 110 may have a smooth, curved edge to enhance comfort when pressed against the urethra 206 and vagina 208. Additionally, FIGS. 8A and 8B illustrate perspective view of alternative embodiments of a vibration portion 800 with detachable grips 802. The detachable grips allow for easier manipulation of the apparatus. The inner surface of the grips has flanges that enhance the grip. There are two openings for the hands or fingers to pass through.

Figure 3:
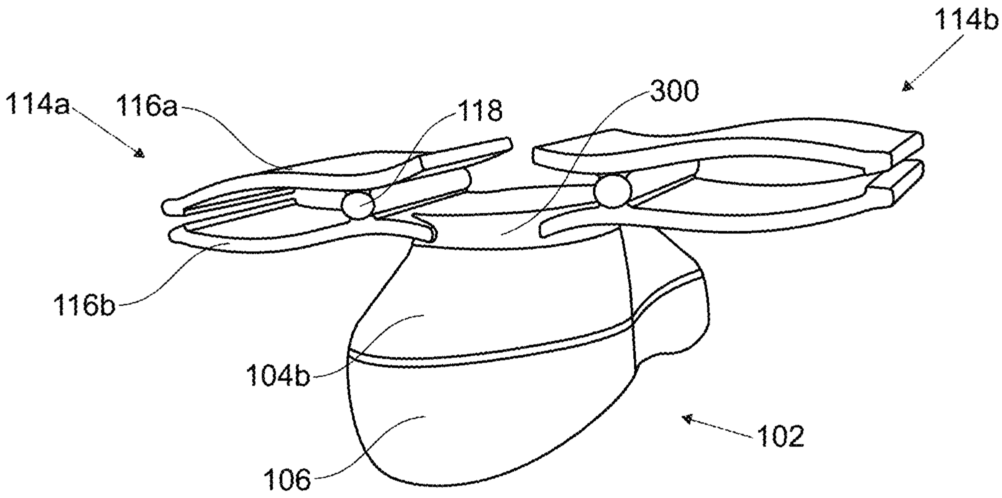
FIG. 3 illustrates a top perspective view of the hands-free female sexual organ stimulation apparatus shown in FIG. 1, showing the tensioned clip above the body of the disc, showing the tensioned clip above the body of the disc; in accordance with an embodiment of the present invention.

Turning now to FIG. 3, the apparatus 100 also includes a vibratory motor 300, operational in the cavity of the vibration portion 108. The vibratory motor 300 is operatively connected to the vibration portion 108. The vibratory motor 300 being operable to vibrate the vibration portion 108 at multiple speeds and intensities. This may include a low, medium, and high setting. However, different speeds and types of vibrations and oscillations, i.e., waves, taps, etc, may also be actuated by the vibratory motor 300.

In addition to vibrating, the vibratory motor 300 is operable to actuate the central section 112 of the vibration portion 108 to oscillate at multiple speeds and intensities at multiple speeds. The vibratory motor 300 may also cause the vibration portion 108 to tap, wave, or perform other motions efficacious for massaging the female sexual organ 200. The vibratory motor 300 may be powered by an internal battery, or an external power source, i.e., AC or DC electricity. In one embodiment, the vibratory motor 300 may be charged at a recharging device.

As discussed above, the apparatus 100 serves to stimulate the vulva 212 region of the female by detachably clipping to the labia majora 202, or outer folds of the vulva 212, to form a snug, mating relationship with the vulva 212 while generating multiple speeds of vibrations that create a stimulating massage in the area of the clitoris 204, urethra 206, and labia minora 210. By clipping the apparatus 100 to the labia majora 202, the hands of the female user are not required for operation. This creates a more comfortable sexual stimulation experience.

Figure 4:
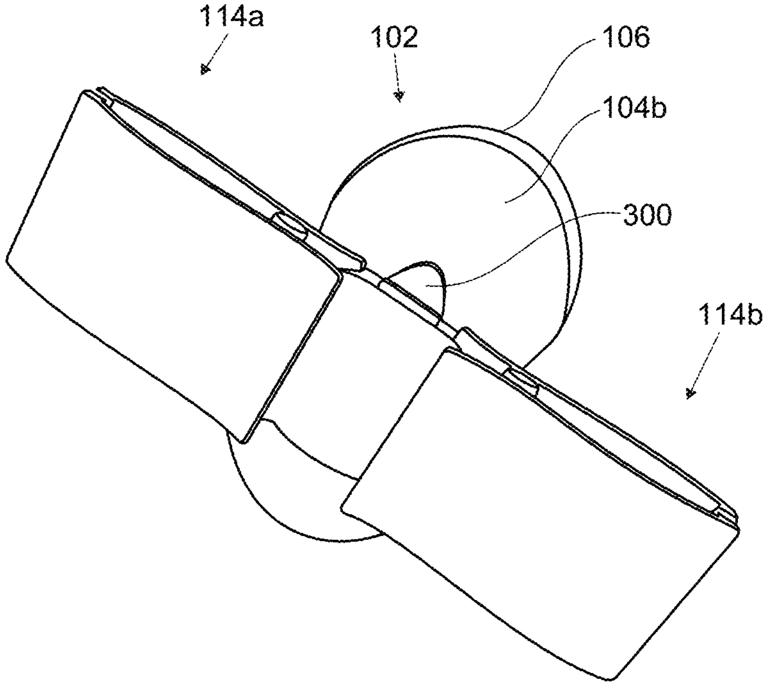
FIG. 4 illustrates a top view of the mount face of the hands-free female sexual organ stimulation apparatus shown in FIG. 1, in accordance with an embodiment of the present invention.

Thus, as FIG. 4 shows, the apparatus 100 provides a tension clip 114*a*, 114*b* diametrically arranged on the mount face 104*b* of the disc 102. The diametric arrangement of the tension clip 114*a-b* helps align the vibration portion 108 concentrically with the urethra 206 while fitted into the vagina 208. The disc 102 can be rotated about the vulva 212 to achieve the desired position for the tension clip 114*a-b*, which creates a more comfortable clipping to the labia majora 202. The tension clip 114*a-b* is biased towards a clamped position. In this manner, the user presses the arms 116*a*, 116*b* together to open the tension clip 114*a-b* for mounting or demounting to the labia majora 202.

In some embodiments, the biased clip 114*a-b* may be configured to any style, size, shape, and type of fastening device, including a painless clip. For example, the biased clip can be a U-shape clip or D-shape clip. The biased clip may also be a clip sufficiently sturdy to attach the female stimulation device on the labia majora 202, or other loose skin outside the vulva 212.

The tension clip 114*a-b* may have a curved shape that is configured to snugly engage the labia majora 202. In some embodiments, the tension clip 114*a-b* may include a pair of curved arms 116*a*. 116*b* and a fulcrum 118. The curved arms 116*a-b* of the tension clip 114*a-b* extend beyond the perimeter of the outer wall 106 of the disc 102. The clip 114*a-b* clip to the labia majora 202 to achieve the objective of sexually stimulating the female sexual organ 200 while eliminating use of the hand. The curved configuration of the clip 114*a-b* also works to minimize pain when attaching the assembly to the vulva 212.

Figure 5:
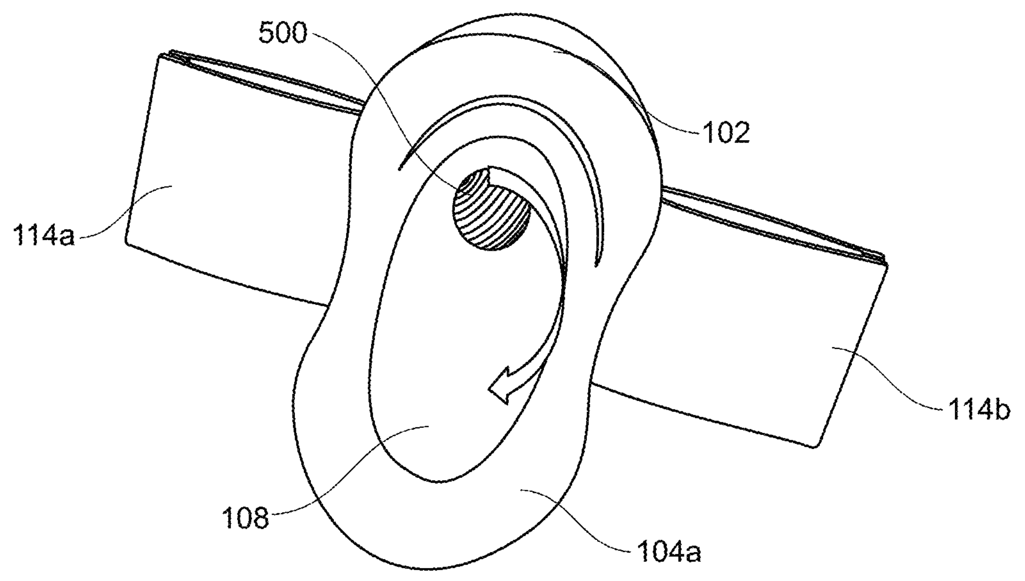
FIG. 5 illustrates a top view of the stimulation face, with the roller being manipulated between the inner walls, in accordance with an embodiment of the present invention.

As FIG. 5 references, the apparatus 100 further comprises a roller 500, such as a spherical ball. The roller 500 is manipulated by the vibratory motor 300 to roll around the central section 112 of the vibration portion 108. The vibratory motor 300 is operable to actuate the roller to roll across the central section 112 of the vibration portion 108 at multiple speeds.

In one non-limiting embodiment, the apparatus 100 also provides for remote control of the vibratory motor 300. Thus, the apparatus 100 provides a receiver 620 that is operatively connected to the vibratory motor 300. The receiver may include an antenna, and be configured to receive a signal, such as a radio frequency signal. The reception of such signals allows for remote operation of the vibratory motor 300, so that the stimulation of the female sexual organ 200 is remote.

In another embodiment, the apparatus 100 comprises a transmitter 624 that works in conjunction with the receiver 620. The transmitter 624 may include a remote-control device that is not physically connected to the disc 102 or vibration portion 108. The transmitter is configured to emit a signal to the receiver to actuate the vibratory motor 300. In one non-limiting embodiment, the signal comprises a radio frequency signal. However, in other embodiments, other types of signaling means known in the art may also be used.

Figure 6:
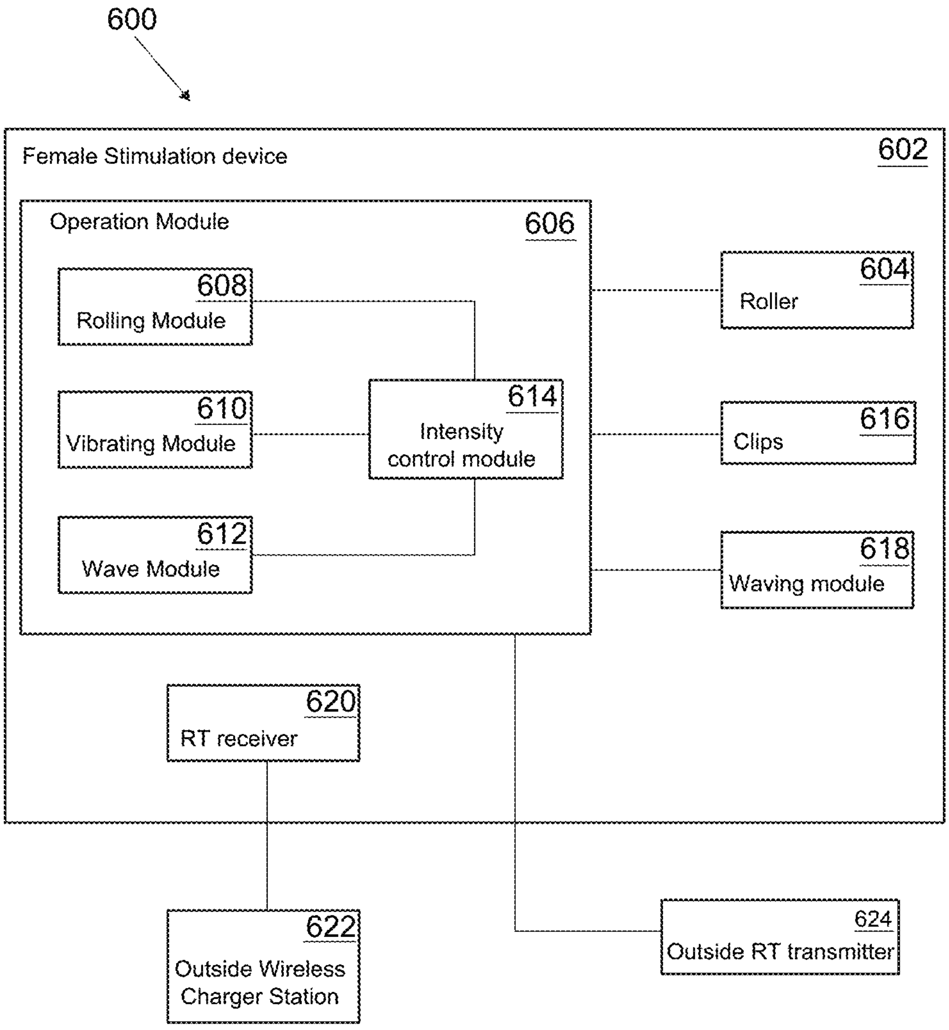
FIG. 6 illustrates a block diagram of an alternative embodiment of Chinese market of the stimulation face, with the roller being manipulated between the inner walls, in accordance with an embodiment of the present invention.

Referring now to FIG. 6, another embodiment of the hands-free female sexual stimulation apparatus 600 is configured for remote control stimulation, including at least one roller 604 disposed inside the stimulation main body, wherein the roller 604 can roll throughout the stimulation main body to provide a rolling effect. Accordingly, the stimulation main body and the clip 616 can be vibrated at different speeds in a vibrating effect.

In one embodiment, the stimulation main device 602 further comprises at least one wave module 618 that is electrically connected with the operation module 606 to generate a waving effect. In yet another embodiment, the wave module 618 is electrically connected with a real time receiver 620. In this arrangement, the wave module 612 can activate the stimulation main body to generate a wave function which can stimulate the vaginal vault tissue.

The female stimulation device 602 further comprises an operation module 606 comprising a rolling module 608, a vibrating module 610, and an intensity control module 614 electrically connected with the rolling module 608. The vibrating module 610, and the wave module 612, Thus, the rolling effect generated by rolling module 610, and the vibrating effect generated by vibrating module 610 can be controlled by an intensity control module 614.

Accordingly, the stimulation main body further comprises a real time receiver 620 that is electrically connected with an outside real time transmitter 624, wherein the outside real time transmitter 624 can transmit various types of signals, including operating signals and intensity control signals to the real time receiver 624. The signals can control the operation module 606 to selectively activate either the rolling module or the vibrating module, and then synchronously activate the intensity control module 614 to control the intensity of the rolling, the vibrating, and the waving effects. In another possible embodiment of the apparatus 600, the operation module 606 can be electrically connected to the roller 604 and the clip 616 to selectively activate the rollers 30 or the clip 616 to generate the rolling and the vibrating effect separately.

In another embodiment, the stimulation main body further comprises a charging module 622 connected with the real time receiver 620 and wirelessly connected with an outside wireless charger station, wherein the stimulation main body can be wirelessly charged by the outside wireless charger station via the charging module 622. In yet another embodiment, the charger module 622 can be a battery module. As used herein, the battery module refers to any style, size, shape, and type of batteries, especially to disposable batteries or rechargeable batteries.

Figure 7:
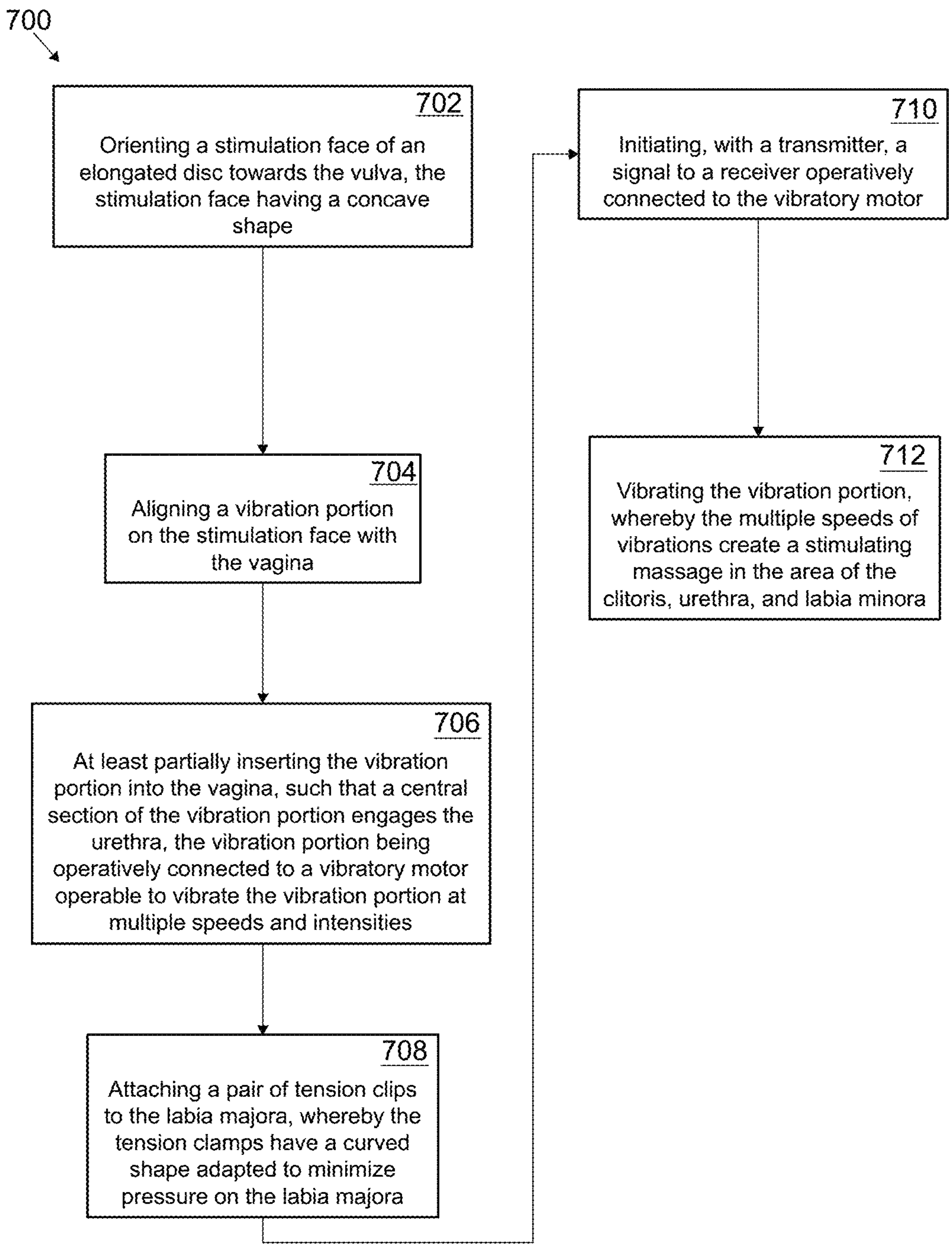
FIG. 7 illustrates a flowchart diagram for method for attaching a hands-free female sexual organ stimulation apparatus to the sexual organ, in accordance with an embodiment of the present invention.

FIG. 7 illustrates a flowchart diagram of an exemplary method 700 for attaching a hands-free female sexual organ stimulation apparatus to the female sexual organ. The method 700 may include an initial Step 702 of orienting a stimulation face of an elongated disc towards the vulva. The disc 102 that forms the foundation of the apparatus 100. The elongated disc 102 is sized and dimensioned to mate with the vulva 212 of the female in a snug relationship. In some embodiments, the disc 102 may have a mount face 104*b*, and an opposing stimulation face 104*a*. The configuration of the stimulation face 104*a* is shaped and dimensioned to form a flush, mating relationship with the vulva 212.

The method 700 may further comprise a Step 704 of aligning a vibration portion on the stimulation face with the vagina. The vibration portion is disposed concentrically on the stimulation face 104*a* of the disc 102. The vibration portion 108 has a central section 112, which may be curvy and smooth. An inner wall 110 protrudes around the perimeter of the vibration portion 108, so as to create space, and thereby ventilation, between the stimulation face 104*a* and the vulva 212. The inner wall 110 is disposed approximately at the perimeter of the central section 112. A Step 706 includes at least partially inserting the vibration portion into the vagina, such that a central section of the vibration portion engages the urethra, the vibration portion being operatively connected to a vibratory motor operable to vibrate the vibration portion at multiple speeds and intensities.

In some embodiments, a Step 708 comprises attaching a tension clip to the labia majora, whereby the tension clamps have a curved shape adapted to minimize pressure on the labia majora. The tension clip 114*a-b* may include a pair of curved arms 116*a*, 116*b* and a fulcrum 118. The curved arms 116*a-b* of the tension clip 114*a-b* extend beyond the perimeter of the outer wall 106 of the disc 102. The clip 114*a-b* clip to the labia majora 202 to achieve the objective of sexually stimulating the female sexual organ 200 while eliminating use of the hand. A Step 710 includes initiating, with a transmitter, a signal to a receiver operatively connected to the vibratory motor. The signal may include a radio frequency signal. In yet other embodiments, a final Step 712 comprises vibrating the vibration portion, whereby the multiple speeds of vibrations create a stimulating massage in the area of the clitoris, urethra, and labia minora.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A hands-free female sexual organ stimulation apparatus, the apparatus comprising:

an elongated disc comprising a mount face and a stimulation face opposing the mount face, the disc further comprising an outer wall extending between the faces;

a vibration portion disposed concentrically on the stimulation face of the disc, the vibration portion comprising a central section and an inner wall, the inner wall disposed around a perimeter of the central section, the inner wall protruding above the central section;

a vibratory motor disposed in a cavity of the vibration portion, the vibratory motor being operatively connected to the vibration portion, the vibratory motor being operable to vibrate the vibration portion at multiple speeds and intensities;

a tension clip diametrically arranged on the mount face of the disc, the tension clip beyond a perimeter of the outer wall of the disc, the tension clip being biased towards a clamped position; and wherein the disc is configured to rotate around a vulva, allowing the tension clip to be adjusted to a specific position that provides a more comfortable attachment to a labia majora.

2. The apparatus of claim 1, wherein the disc has an oval shape.

3. The apparatus of claim 1, wherein the stimulation face is adapted to form a flush, mating relationship with the vulva.

4. The apparatus of claim 1, wherein the outer wall of the disc is defined by a curved smooth shape.

5. The apparatus of claim 1, wherein the inner wall of the vibration portion is defined by a curved smooth shape.

6. The apparatus of claim 1, wherein the vibration portion is adapted to engage a clitoris while at least partially fitted into a vagina.

7. The apparatus of claim 1, wherein the tension clip comprises a pair of curved arms, the curved arms adapted to clip to the labia majora.

8. The apparatus of claim 7, wherein the curved shape of the curved arms reduces pressure on the clipped labia majora.

9. The apparatus of claim 1, further comprising a roller operatively connected to the vibratory motor, the roller being operable to roll around the central section of the vibration portion.

10. The apparatus of claim 9, wherein the vibratory motor is operable to actuate the roller to roll across the central section of the vibration portion at multiple speeds.

11. The apparatus of claim 1, wherein the vibratory motor is operable to actuate the central section of the vibration portion to oscillate, wave, or tap a urethra and a vagina at multiple speeds and intensities.

12. The apparatus of claim 1, further comprising a receiver operatively connected to the vibratory motor.

13. The apparatus of claim 12, further comprising a transmitter, the transmitter emitting a signal to the receiver, the signal configured to actuate the vibratory motor.

14. The apparatus of claim 13, wherein the signal comprises a radio frequency signal.

15. A hands-free female sexual organ stimulation apparatus, the apparatus comprising:

an elongated disc comprising a mount face and a stimulation face opposing the mount face, the disc further comprising an outer wall extending between the faces, the stimulation face being adapted to form a flush, mating relationship with a vulva;

a vibration portion disposed concentrically on the stimulation face of the disc, the vibration portion comprising a central section and an inner wall defined by a curved smooth shape, the inner wall disposed around a perimeter of the central section, the inner wall protruding above the central section, the vibration portion being adapted to engage a urethra while at least partially fitted into a vagina;

a vibratory motor disposed in a cavity of the vibration portion, the vibratory motor being operatively connected to the vibration portion, the vibratory motor being operable to vibrate the vibration portion at multiple speeds and intensities;

a tension clip comprising a pair of curved arms and a fulcrum, the curved arms being adapted to clip a labia majora, whereby a curved shape of the curved arms reduces pressure on the clipped labia majora, the tension clip being diametrically arranged on the mount face of the disc, the tension clip extending beyond a perimeter of the outer wall of the disc, the tension clip being biased towards a clamped position;

a receiver operatively connected to the vibratory motor;

a transmitter emitting a signal to the receiver, the signal configured to actuate the vibratory motor; and wherein the disc is configured to rotate around the vulva, allowing the tension clip to be adjusted to a specific position that provides a more comfortable attachment to a labia majora.

16. The apparatus of claim 15, further comprising a roller operatively connected to the vibratory motor, the roller being operable to roll around the central section of the vibration portion, the vibratory motor being operable to actuate the roller to roll across the central section of the vibration portion at multiple speeds.

17. The apparatus of claim 15, further comprising a wireless charging station electrically connected to the vibratory motor and the receiver.

18. A method for attaching a hands-free female sexual organ stimulation apparatus to a female sexual organ, the method comprising:

orienting a stimulation face of an elongated disc towards the vulva;

aligning a vibration portion on the stimulation face with the vagina;

at least partially inserting the vibration portion into the vagina, such that a central section of the vibration portion engages the urethra, the vibration portion being operatively connected to a vibratory motor operable to vibrate the vibration portion at multiple speeds and intensities;

attaching a tension clip to the labia majora, whereby the tension clip has a curved shape adapted to minimize pressure on the labia majora;

initiating, with a transmitter, a signal to a receiver operatively connected to the vibratory motor;

vibrating the vibration portion, whereby the multiple speeds of vibrations create a stimulating massage in the area of the clitoris, urethra, and labia minora; and wherein the disc is configured to rotate around the vulva, allowing the tension clip to be adjusted to a specific position that provides a more comfortable attachment to the labia majora.

* * * * *